US012770888B2

(12) United States Patent
Hwang et al.

(10) Patent No.: US 12,770,888 B2
(45) Date of Patent: Oct. 20, 2026

(54) CATALYST FOR FUEL CELL AND METHOD FOR PREPARING THE SAME

(71) Applicants: HYUNDAI MOTOR COMPANY, Seoul (KR); KIA CORPORATION, Seoul (KR)

(72) Inventors: Jee Youn Hwang, Seoul (KR); Eunjik Lee, Uiwang-si (KR); Dahee Kwak, Gunpo-si (KR); Ji-Hoon Jang, Suwon-si (KR); Songi Oh, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 195 days.

(21) Appl. No.: 18/584,570

(22) Filed: Feb. 22, 2024

(65) Prior Publication Data

US 2024/0194896 A1 Jun. 13, 2024

Related U.S. Application Data

(62) Division of application No. 17/459,479, filed on Aug. 27, 2021, now abandoned.

(30) Foreign Application Priority Data

Dec. 24, 2020 (KR) ........................ 10-2020-0182778

(51) Int. Cl.
*H01M 4/86* (2006.01)
*H01M 4/92* (2006.01)

(52) U.S. Cl.
CPC ....... *H01M 4/8657* (2013.01); *H01M 4/8652* (2013.01); *H01M 4/921* (2013.01); *H01M 4/926* (2013.01)

(58) Field of Classification Search
CPC ............. H01M 4/8657; H01M 4/8652; H01M 4/8882; H01M 4/921; H01M 4/926; H01M 8/1018
See application file for complete search history.

(56) References Cited

U.S. PATENT DOCUMENTS

2003/0096156 A1 5/2003 Asaoka et al.
2009/0162725 A1 * 6/2009 Terazono ............ H01M 8/1004 429/480

(Continued)

FOREIGN PATENT DOCUMENTS

CN 106960966 A 7/2017
KR 2020-0001064 A1 1/2020
WO WO-2014105407 A1 * 7/2014 ............ H01M 4/926

OTHER PUBLICATIONS

Kuttiyiel et al., Enhancement of the oxygen reduction on nitride stabilized pt-M (M=Fe, Co, and Ni) core-shell nanoparticle electrocatalysts, 2015, Nano Energy, 13. 442-449 (Year: 2015).*

(Continued)

*Primary Examiner* — Daniel S Gatewood
(74) *Attorney, Agent, or Firm* — MCDONNELL BOEHNEN & BERGHOFF LLP

(57) ABSTRACT

A catalyst for a fuel cell includes: a crystalline carbon support having a specific surface area of about 200 $m^2/g$ to about 500 $m^2/g$; and intermetallic active particles of a transition metal and a noble metal, wherein the intermetallic active particles are supported on the crystalline carbon support and have a particle diameter of greater than or equal to about 3 nm.

8 Claims, 11 Drawing Sheets

(56) References Cited

U.S. PATENT DOCUMENTS

| | | | | |
|---|---|---|---|---|
| 2012/0046164 | A1* | 2/2012 | Tanaka | B01J 37/0211 502/305 |
| 2015/0295250 | A1 | 10/2015 | Nagami et al. | |
| 2016/0233520 | A1* | 8/2016 | Takahashi | H01M 4/926 |
| 2017/0200956 | A1 | 7/2017 | Nagami et al. | |

OTHER PUBLICATIONS

Jang et al., Rational synthesis of core-shell Fex@Pt nanoparticles for the study of electrocatalytic oxygen reduction reaction, 2013, Sci. Rep., 3, 2872 (Year: 2013).*

Jang, JH., et al., "Rational syntheses of core-shell Fex@Pt nanoparticles for the study of electrocatalytic oxygen reduction reaction," Sci Rep 3, 2872 (2013). https://doi.org/10.1038/srep02872.

Junrui Li, et al., "Hard-Magnet L10-CoPt Nanoparticles Advance Fuel Cell Catalysis," Joule 3, 124-135, Jan. 16, 2019.

Chung DY, et al., "Highly Durable and Active PtFe Nanocatalyst for Electrochemical Oxygen Reduction Reaction," J Am Chem Soc. Dec. 16, 2015;137(49):15478-85. doi: 10.1021/jacs.5b09653. Epub Dec. 3, 2015. PMID: 26670103.

Ji-Hoon Jang et al., "One-pot synthesis of core-shell-like Pt3Co nanoparticle electrocatalyst with Pt-enriched surface for oxygen reduction reaction in fuel cells", Energy Environ. Sci., Oct. 21, 2011, vol. 4, p. 4947-4953.

* cited by examiner

CATALYST FOR FUEL CELL AND METHOD FOR PREPARING THE SAME

CROSS REFERENCE TO RELATED APPLICATIONS

The present application is a divisional of U.S. patent application Ser. No. 17/459,479, filed Aug. 27, 2021, which claims priority to and the benefit of Korean Patent Application No. 10-2020-0182778, filed on Dec. 24, 2020. The entire disclosure contents of these applications are herewith incorporated by reference into the present application.

FIELD

The present disclosure relates to a catalyst for a fuel cell and a method for preparing the same.

BACKGROUND

The statements in this section merely provide background information related to the present disclosure and may not constitute prior art.

A fuel cell is an energy conversion device that directly converts chemical energy of a fuel into electrical energy. The fuel cell has superior efficiency compared with existing internal combustion engines, and is spotlighted as a next-generation energy source due to its high energy density and environment-friendliness.

Polyelectrolyte fuel cells (PEMFC) and direct methanol fuel cells (DMFC) mainly operate at a low temperature of less than or equal to about 80° C., and thus an electrode catalyst is desired to increase rates of oxidation and reduction reactions of the fuel cell. In particular, platinum is mainly used as an electrode catalyst for a fuel cell because it is the only catalyst capable of promoting oxidation of fuel (hydrogen or alcohol) and reduction of oxygen from room temperature to around 100° C. However, since platinum reserves are limited and very expensive, it is very important to reduce the amount of platinum used or increase catalytic activity per unit mass for commercialization of fuel cells.

Studies on platinum alloy catalysts are being conducted. Platinum alloy catalysts theoretically have higher activity and stability than pure platinum catalysts due to electrical and structural characteristics of the particle surface, and thus are attracting attention as a reliable alternative to fuel cell electrode materials. Among them, the regularly arranged alloy catalyst structure (intermetallic structure) is spotlighted, because it shows high durability when applied to fuel cells because heterogeneous alloy metals do not melt out.

In order for the platinum alloy catalyst to exhibit this intermetallic catalyst structure, a site at which a catalyst having a particle size of greater than or equal to about 3 nm may be synthesized is desired. However, when a high specific surface area carbon support is used, catalyst particles are not only mostly adsorbed into pores of the carbon support but also synthesized to have a size of less than or equal to about 3 nm. Therefore, the catalyst particles present in the pores of the carbon support may not be exhibit the intermetallic structure, eventually deteriorating a yield rate of intermetallic catalysts.

SUMMARY

One form of the present disclosure provides a catalyst for fuel cells having a high area ratio of active catalyst by reducing a contact area between active particles and a carbon support, easily forming a three-phase interface and providing appropriate adhesion, and reducing the use of platinum by maximizing an utilization rate of the active particles.

Another form of the present disclosure provides a method of preparing a catalyst for a fuel cell capable of increasing a yield rate and a utilization rate of intermetallic active particles.

Another form of the present disclosure provides an electrode including a catalyst for a fuel cell.

Another form of the present disclosure provides a membrane-electrode assembly including an electrode.

Another form of the present disclosure provides a fuel cell including a membrane-electrode assembly.

According to one form of the present disclosure, a catalyst for a fuel cell includes a crystalline carbon support having a specific surface area of about 200 $m^2/g$ to about 500 $m^2/g$, and intermetallic active particles of a transition metal and a noble metal wherein the intermetallic active particles have a particle diameter of greater than or equal to about 3 nm and are supported on the crystalline carbon support.

The crystalline carbon support may have a Raman spectrum intensity ratio of (1360) plane and (1590) plane, $I_G/I_D$ ((I(1580 $cm^{-1}$)/I(1360 $cm^{-1}$)) of greater than or equal to about 0.9.

The crystalline carbon support may have an interplanar spacing ($d_{002}$) of the (002) plane of less than or equal to about 0.355 nm.

The crystalline carbon support may have a carbon shell thickness of about 3 nm to about 6 nm.

The crystalline carbon support may include carbon black, graphite, or combinations thereof.

The catalyst for a fuel cell may include more than about 60% by number of intermetallic active particles having a particle diameter of greater than or equal to about 3 nm with respect to the total number of intermetallic active particles.

The catalyst for a fuel cell may include about 40% or less by number of intermetallic active particles present in the pores of the carbon support with respect to the total number of intermetallic active particles.

The catalyst for a fuel cell may include more than 60% by number of intermetallic active particles participating in catalytic activity with respect to the total number of intermetallic active particles.

The intermetallic active particles may include an intermetallic core of a transition metal and a noble metal, and a noble metal skin layer surrounding the intermetallic core.

An atomic ratio of the noble metal and the transition metal in the intermetallic active particles may be about 1:0.2 to about 1:0.6.

The noble metal may include platinum (Pt), ruthenium (Ru), osmium (Os), iridium (Ir), palladium (Pd), an alloy thereof, or a mixture thereof.

The transition metal may include cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), molybdenum (Mo), ruthenium (Ru), rhodium (Rh), osmium (Os), palladium (Pd), cadmium (Cd), iridium (Ir), gold (Au), silver (Ag), an alloy thereof, or a mixture thereof.

According to another form of the present disclosure, a method of preparing a catalyst for a fuel cell includes supporting a noble metal and a transition metal on a crystalline carbon support having a specific surface area of about 200 $m^2/g$ to about 500 $m^2/g$; and annealing the crystalline carbon support on which the noble metal and the transition metal are supported.

The method of preparing a catalyst for a fuel cell may further include coating a protective layer on the surface of the crystalline carbon support on which the noble metal and the transition metal are supported before the annealing process.

The protective layer may be an organic protective layer including polydopamine, polyaniline, polypyrrole, or a combination thereof, or an inorganic protective layer including carbon, metal oxide, ceramic, or a combination thereof.

According to another form of the present disclosure, a method of preparing a catalyst for a fuel cell includes irradiating ultrasonic waves to a precursor mixed solution including a noble metal precursor, a transition metal precursor, and a crystalline carbon support having a specific surface area of about 200 $m^2/g$ to about 500 $m^2/g$ to form core-shell particles including a transition metal oxide coating layer; annealing the core-shell particles to form intermetallic particles including a transition metal oxide coating layer; and removing the transition metal oxide coating layer from the intermetallic particles.

The core-shell particles may include a transition metal core, a noble metal shell surrounding the transition metal core, and a transition metal oxide coating layer surrounding the noble metal shell.

The irradiating of the ultrasonic waves may be performed for about 20 minutes to about 2 hours at an output of about 125 W to about 200 W based on 100 mL of the precursor mixed solution.

The intermetallic particles may include intermetallic particles of a transition metal and a noble metal, and a transition metal oxide coating layer surrounding the intermetallic particles.

The annealing may be performed at about 700° C. to about 1200° C. for about 2 hours to about 4 hours.

The annealing may be performed under a mixed gas including hydrogen ($H_2$) and argon (Ar), and the mixed gas may include hydrogen ($H_2$) in an amount of about 1 volume % to about 10 volume % based on a total volume of the mixed gas.

The removing of the transition metal oxide coating layer from the intermetallic particles may be performed by acid treatment at about 60° C. to about 94° C. for about 2 hours to 4 hours.

The acid used for the acid treatment may include $HClO_4$, $HNO_3$, $H_2SO_4$, HCl, or a combination thereof.

A concentration of the acid may be about 0.01 M to about 1.0 M.

The catalyst for a fuel cell according to one form of the present disclosure may have a high area ratio of an active catalyst by reducing a contact area between active particles and a carbon support, easily form a three-phase interface and provide an appropriate adhesion, and reduce the use of platinum by increasing an utilization rate of the active particles.

The method of preparing a catalyst for a fuel cell according to another form of the present disclosure may increase a yield rate and a utilization rate of intermetallic active particles.

Further areas of applicability will become apparent from the description provided herein. It should be understood that the description and specific examples are intended for purposes of illustration only and are not intended to limit the scope of the present disclosure.

BRIEF DESCRIPTION OF THE FIGURES

In order that the disclosure may be well understood, there will now be described various forms thereof, given by way of example, reference being made to the accompanying drawings, in which.

Figure 1:
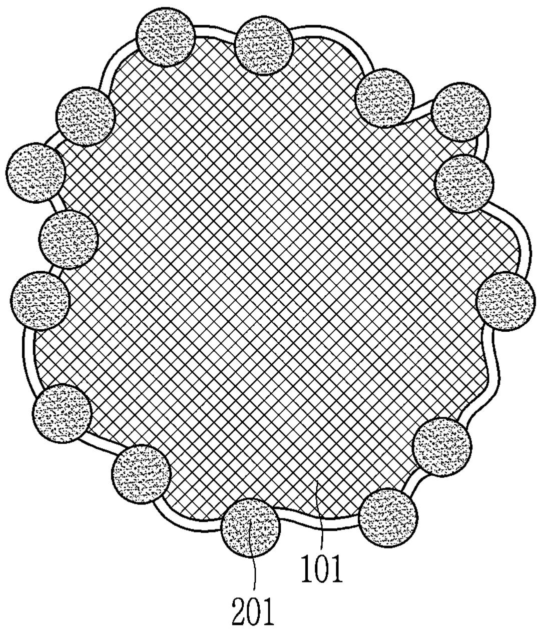
FIG. 1 is a schematic view showing a catalyst for a fuel cell according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The advantages and features of the present disclosure and the methods for accomplishing the same will be apparent from the forms described hereinafter with reference to the accompanying drawings. However, the forms should not be construed as being limited to the forms set forth herein. Unless otherwise defined, all terms (including technical and scientific terms) used herein have the same meaning as commonly understood by one of ordinary skill in the art. In addition, terms defined in a commonly used dictionary are not to be ideally or excessively interpreted unless explicitly defined. In addition, unless explicitly described to the contrary, the word “comprise”, and variations such as “comprises” or “comprising,” will be understood to imply the inclusion of stated elements but not the exclusion of any other elements.

Further, the singular includes the plural unless mentioned otherwise.

The catalyst for a fuel cell according to one form of the present disclosure includes a crystalline carbon support and intermetallic active particles supported on the crystalline carbon support.

Figure 2:
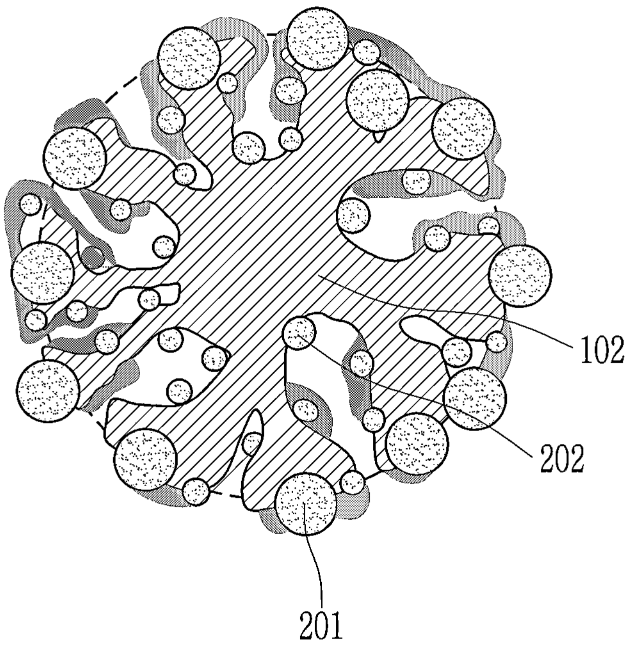
FIG. 2 is a schematic view showing a catalyst for a fuel cell according to the prior art.

FIG. 1 is a schematic view showing a catalyst for a fuel cell according to one form of the present disclosure, and FIG. 2 is a schematic view showing a catalyst for a fuel cell according to the prior art.

FIG. 1 shows intermetallic active particles 201 having a particle diameter of greater than or equal to about 3 nm supported on the surface of a crystalline carbon support 101, and FIG. 2 shows intermetallic active particles 201 having a particle diameter of greater than or equal to about 3 nm supported on the surface of a high specific surface area carbon support 102 and alloy particles 202 having a particle diameter of less than about 3 nm supported inside pores of the high specific surface area carbon support 102.

As shown in FIG. 2, when the high specific surface area carbon support 102 is used to synthesize the intermetallic active particles 201, the alloy particles 202 located inside the pores of the high specific surface area carbon support 102 are formed to have a small particle diameter of less than about 3 nm. However, in order to exhibit an intermetallic structure, the alloy particles 202 should be formed to have a particle diameter of greater than or equal to about 3 nm, but when the particle diameter is less than about 3 nm, the alloy particles 202 may be synthesized as an alloy, but not the intermetallic structure. In addition, the active particles 202 synthesized inside the pores of the high specific surface area carbon support 102 hardly contact with an ionomer and thus become electrochemically inert.

On the other hand, as shown in FIG. 1, when the crystalline carbon support 101 is used to synthesize the intermetallic active particles 201, most of the intermetallic active particles 201 are positioned on the surface of the crystalline carbon support 101 and synthesized to have a size of greater than or equal to about 3 nm through an annealing process.

In other words, when the intermetallic active particles 201 are synthesized by using the crystalline carbon support 101, a contact area between the intermetallic active particles 201 and the crystalline carbon support 101 is reduced, increasing an area ratio of active catalyst, the three-phase interface is easily formed, while appropriate adhesion is provided, and the use amount of platinum may be reduced by increasing an utilization rate of the active particles.

The crystalline carbon support 101 may have a specific surface area of about 200 $m^2/g$ to about 500 $m^2/g$. When the crystalline carbon support 101 has a specific surface area of less than about 200 $m^2/g$, dispersibility of the catalyst may be deteriorated, when the crystalline carbon support 101 has a specific surface area of greater than about 500 $m^2/g$, efficiency of the catalyst may be deteriorated.

The crystalline carbon support 101 may have a Raman spectrum intensity ratio of (1360) plane and (1590) plane, $I_G/I_D((I(1580\ cm^{-1})/I(1360\ cm^{-1}))$ of greater than or equal to about 0.9, for example, about 0.9 to about 1.25. When the Raman spectral intensity ratio, $I_G/I_D$ of the crystalline carbon support 101 is less than about 0.9, the corrosion resistance of the catalyst may be deteriorated.

The crystalline carbon support 101 may have an interplanar spacing ($d_{002}$) of the (002) plane of less than or equal to about 0.355 nm, for example about 0.34 nm to about 0.355 nm. When the interplanar spacing ($d_{002}$) of the (002) plane of the crystalline carbon support 101 exceeds about 0.355 nm, a yield rate of catalyst particles may be lowered.

The crystalline carbon support may have a carbon shell thickness of about 3 nm to about 6 nm. When the carbon shell thickness of the crystalline carbon support 101 is less than about 3 nm, corrosion resistance may be reduced, and when it exceeds about 6 nm, the catalyst particle distribution may be reduced.

The crystalline carbon support 101 may be a spherical carbon support including carbon black, graphite, or a combination thereof. The carbon black may include denka black, ketjen black, acetylene black, channel black, furnace black, lamp black, thermal black, or a combination thereof.

The intermetallic active particles 201 have an intermetallic structure in which transition metals and noble metals are regularly arranged.

The noble metal may include platinum (Pt), ruthenium (Ru), osmium (Os), iridium (Ir), palladium (Pd), an alloy thereof, or a mixture thereof.

The transition metal may include cobalt (Co), iron (Fe), nickel (Ni), zinc (Zn), tin (Sn), manganese (Mn), copper (Cu), scandium (Sc), titanium (Ti), vanadium (V), chromium (Cr), zirconium (Zr), yttrium (Y), niobium (Nb), molybdenum (Mo), ruthenium (Ru), rhodium (Rh), osmium (Os), palladium (Pd), cadmium (Cd), iridium (Ir), gold (Au), silver (Ag), an alloy thereof, or a mixture thereof.

The intermetallic active particles 201 may have a particle diameter of greater than or equal to about 3 nm, for example, about 3 nm to about 6 nm. When the intermetallic active particles 201 have a particle diameter of less than about 3 nm, a disordered alloy structure, but not an intermetallic structure, may be formed.

The catalyst for a fuel cell includes the crystalline carbon support 101 and thus may include about 60% by number or more of the intermetallic active particles 201 having a particle diameter of greater than or equal to about 3 nm based on the total number of the intermetallic active particles 201, for example, greater than 60% by number and less than or equal to about 100% by number and also may include about 40% by number of the intermetallic active particles 201 inside the pore of the crystalline carbon support 101, for example, about 0% by number to about 40% by number.

In addition, since intermetallic active particles 201 of the crystalline carbon support 101 on the surface but not inside the pores thereof is approximately proportional with electrochemical performance of the catalyst for a fuel cell, when the catalyst for a fuel cell includes more than about 60% by number of the intermetallic active particles 201 having a particle diameter of greater than or equal to about 3 nm or less than or equal to about 40% by number of the intermetallic active particles 201 inside the pores of the crystalline carbon support 101 based on the total number of the intermetallic active particles 201, the catalyst for a fuel cell may include more than about 60% by number of the intermetallic active particles 201 participating in catalytic activity, for example, greater than about 60% by number and less than or equal to about 100% by number based on the total number of the intermetallic active particles 201.

For example, when the intermetallic active particles 201 are located not inside the pores of the crystalline carbon support 101 but only on the surface of the crystalline carbon support 101, that is, about 0% by number of the intermetallic active particles 201 inside the pores of the crystalline carbon support 101, the catalyst for a fuel cell may exhibit both excellent electrochemical performance and durability.

The intermetallic active particles 201 may include a noble metal skin layer (not shown) surrounding these particles on the surfaces.

As described later, since the intermetallic active particles 201 in the presence of a protective layer are annealed, noble metal particles may be exposed to the outer surface of the intermetallic active particles 201 and then, formed into the noble metal skin layer in which noble metal particles are dispersed at high density on the surfaces of the intermetallic active particles 201.

In general, since a slurry preparation process for electrode formation proceeds at a pH of less than or equal to about 1, and the fuel cell is operated in an acidic atmosphere, the transition metals in the alloy catalyst may be easily eluted, and the eluted transition metals enter the ion exchange membrane to increase the membrane resistance. As a result, deterioration of the fuel cell performance may be caused.

However, since a catalyst for a fuel cell manufactured in the method of preparing the catalyst for a fuel cell includes the noble metal skin layer on the surface, elution of transition metals is suppressed, thereby inhibiting the deterioration of performance of the fuel cell.

The noble metal skin layer may have a thickness of less than or equal to about 0.5 nm or about 0.2 nm to about 0.5 nm. When the noble metal skin layer has a thickness of greater than about 0.5 nm, the catalyst has a similar surface structure to that of a conventional platinum catalyst, having an insignificant performance improvement effect due to alloying.

In the catalyst for a fuel cell, the noble metals and the transition metals may have an atom ratio of about 1:0.2 to about 1:0.6. When the transition metal has an atom ratio of less than about 0.2, the intermetallic structure may be difficult to form, but when the atom ratio is greater than about 0.6, the noble metal skin layer may have an insignificant thickness.

The method of preparing the catalyst for a fuel cell according to another form of the present disclosure includes supporting a noble metal and a transition metal on a crystalline carbon support having a specific surface area of about 200 $m^2/g$ to about 500 $m^2/g$; and annealing the crystalline carbon support supported by the noble metal and the transition metal.

Figure 3:
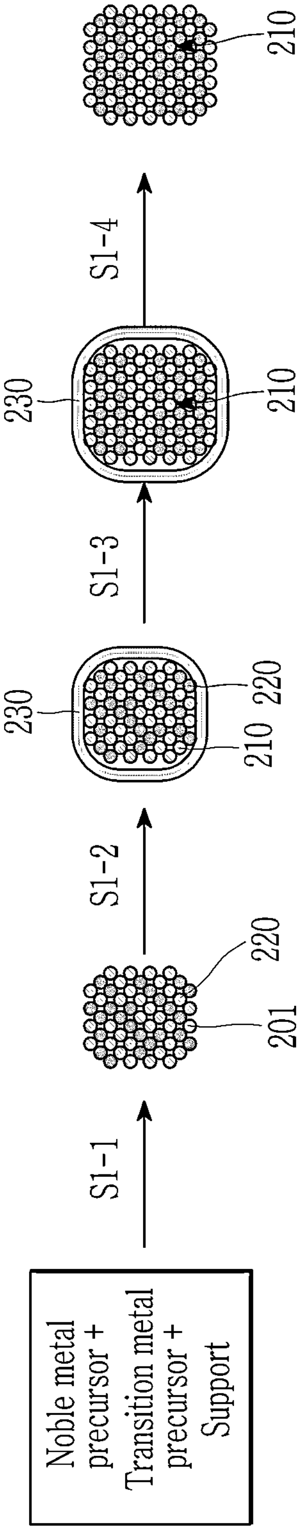
FIG. 3 is a schematic view showing a method of preparing a catalyst for a fuel cell according to another form of the present disclosure.

FIG. 3 is a schematic view showing a method of preparing a catalyst for a fuel cell according to another form of the present disclosure. Referring to FIG. 3, a method of preparing a catalyst for a fuel cell is described.

First, the noble metal 210 and the transition metal 220 are supported on a crystalline carbon support (S1-1).

Specifically, a noble metal precursor and a transition metal precursor are dispersed on the crystalline carbon support and then reduced by using a reducing agent. The reduction of the dispersed noble metal precursor and transition metal precursor may be performed in various reduction methods (e.g., a polyol method).

For example, the crystalline carbon support is added to a solvent (e.g., ethylene glycol) and then, dispersed by using ultrasonic wave dispersion and/or magnetic stirring. After adding the noble metal precursor and the transition metal precursor to the crystalline carbon support dispersion, pH of the solution is adjusted. Subsequently, the resultant is reacted at a temperature higher than room temperature for a predetermined time to reduce the noble metal precursor and the transition metal precursor, obtaining the crystalline carbon on which the noble metal 210 and the transition metal 220 are supported.

The noble metal precursor may be in a form of a noble metal salt, and may include a nitrate, a sulfate, an acetate, a chloride, an oxide, or a combination thereof, and the transition metal precursor may be in a form of salts of the transition metal, and may include, for example, a nitrate, a sulfate, an acetate, a chloride, an oxide, or a combination thereof. Since the content of the crystalline carbon support is the same as described above, a repetitive description will be omitted.

Optionally, the method of preparing the catalyst for a fuel cell may further include coating a protective layer 230 on the surface of the crystalline carbon support on which the noble metal 210 and the transition metal 220 are supported before the annealing process (S1-2). The protective layer 230 is annealed after the coating to expose noble metal particles on the outer surfaces of the active particles and thus form the noble metal skin layer in which the noble metal particles are dispersed at high density on the surface of the catalyst for a fuel cell.

The protective layer 230 may be an organic protective layer including polydopamine, polyaniline, polypyrrole, or a combination thereof, or an inorganic protective layer including carbon, metal oxide, ceramic, or a combination thereof.

For example, the protective layer 230 may be formed by first coating a polymer containing carbon atoms as a main component, specifically, an organic polymer that is carbonizable through an annealing process at a high temperature under an inert gas atmosphere and then, annealing the organic polymer under the hydrogen-deficient inert gas atmosphere at the high temperature to convert the organic polymer into a carbon coating layer. The organic polymer may include polypyrrole (PPy), polyaniline (PANI), polydopamine (PDA), or a combination thereof.

For another example, the protective layer 230 may be formed as a silica coating layer by dispersing the crystalline carbon support on which the noble metal 210 and the transition metal 220 are supported in a mixed solution of water and alcohol and then, adding a silica precursor thereto. The alcohol has good miscibility with the water, and lower alcohol may be used to facilitate the formation of the silica coating layer through a sol-gel reaction of the silica precursor. When the silica precursor is added to the solution in which the crystalline carbon support supported by the noble metal 210 and the transition metal 220 is dispersed and then, stirred, the silica coating layer is formed through the sol-gel reaction under a base catalyst. As the silica precursor, TEOS (tetraethly orthosilicate), TMOS (tetramethyl orthosilicate), TBOS (tetrabuthyl orthosilicate), or a combination thereof may be used. As a catalyst for the silica sol-gel reaction, a base compound of aqueous ammonia ($NH_4OH$), sodium hydroxide (NaOH), or potassium hydroxide (KOH) may be used.

Next, the crystalline carbon support on which the noble metal 210 and the transition metal 220 are supported is annealed (S1-3).

Through the annealing process, an alloying degree of the noble metal 210 and the transition metal 220 is increased, forming the intermetallic active particles 201.

Herein, since the protective layer 230 controls sizes of the intermetallic active particles 201 into several nanometers by suppressing their growths during the annealing process, the alloying degree may be increased by sufficiently performing the annealing process at a high temperature annealing, thereby enhancing composition uniformity and catalytic activity.

The annealing process may be performed at about 700° C. to about 1200° C. for about 2 hours to about 4 hours. When the annealing process is performed at less than about 700° C. or for less than about 1 hour, the alloying degree-improving effect is deteriorated, limiting in the increase of the catalytic activity, but when at greater than about 1200° C. or for greater than about 10 hours, the particle growth-suppressing effect is deteriorated, resulting in a decrease of the catalytic activity.

The annealing process may be performed under an inert gas atmosphere such as argon, nitrogen, and the like or under a mixed gas atmosphere of inert gas and hydrogen ($H_2$), wherein the hydrogen may be included within the range of about 1 volume % to about 10 volume % based on a total volume of the mixed gas.

Finally, the surface of the annealed intermetallic active particles 201 is acid-treated to remove impurities and residual acid (S1-4).

Through the acid-treatment, the protective layer 230 remaining on the surface of the prepared intermetallic active particles 201, impurities, and transition metal remaining on the surface may be removed (eluted).

For example, the intermetallic active particles 201 are added to an acid aqueous solution and then, refluxed at a predetermined temperature (e.g., about 80° C.) for predetermined times (e.g., about 3 hours). On the other hand, the acid aqueous solution may include, for example, sulfuric acid ($H_2SO_4$), nitric acid ($HNO_3$), hydrochloric acid (HCl), acetic acid ($CH_3COOH$), or a combination thereof.

Residual acid may be removed by performing filtering and drying processes together. In other words, the intermetallic active particles 201 are filtered and then, several time treated with distilled water to remove the residual acid solution. In addition, in order to keep the surfaces of the intermetallic active particles 201 clean, the intermetallic active particles 201 may be dried in a dry oven or a vacuum oven filled with an inert gas.

A method of preparing a catalyst for a fuel cell according to one form of the present disclosure includes irradiating ultrasonic waves to a precursor mixed solution to form core-shell particles including a transition metal oxide coating layer, annealing the core-shell particles to form intermetallic particles including a transition metal oxide coating layer, and removing the transition metal oxide coating layer from the intermetallic particles.

Figure 4:
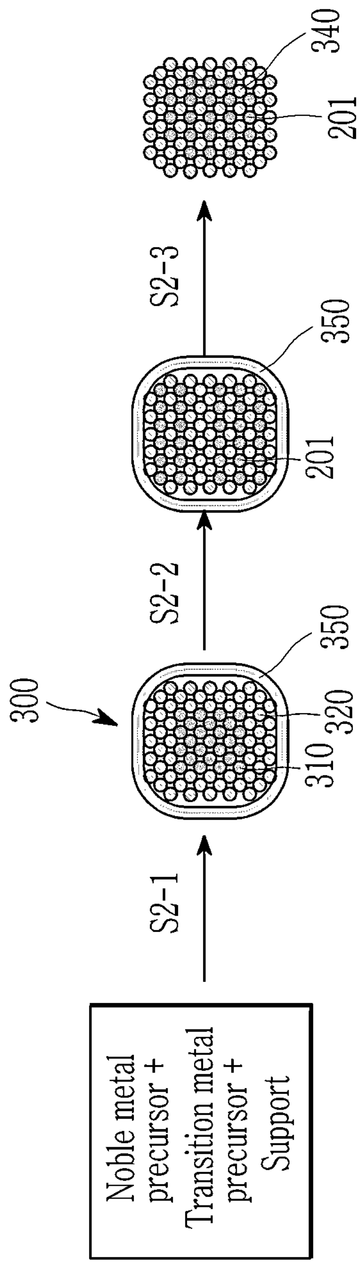
FIG. 4 is a schematic view showing a method of preparing a catalyst for a fuel cell according to another form of the present disclosure.

FIG. 4 is a schematic view showing a method of preparing a catalyst for a fuel cell according to another form of the present disclosure. Referring to FIG. 4, a method of preparing a catalyst for a fuel cell is described.

The core-shell particles 300 including the transition metal oxide coating layer 350 are formed by irradiating ultrasonic waves to the precursor mixed solution including the noble metal precursor, the transition metal precursor and the support (S2-1).

High frequency oscillation of the ultrasonic waves generates bubbles in a cavity, resulting in oscillatory growth, and when the oscillation finally reaches a certain scale, the cavity explodes. This series of processes caused by the ultrasonic irradiation is called "an acoustics cavitation mechanism."

The cavity explosion occurring in the final stage of the acoustics cavitation mechanism may cause a huge amount of thermal energy up to about 5000 K, which is dissipated in a very short time of about 10-6 seconds.

When reactants in the chemical reaction combined with ultrasonic irradiation are at least two materials having different vapor pressures, the at least two reactants have different evaporation rates to bubbles by a high frequency oscillation of ultrasonic waves, so that structural and electrochemical characteristics of the reaction resultants may be controlled using the same. For example, when nanoparticles including at least two metals are prepared by using a noble metal precursor and a transition metal precursor as reactants and irradiating the same with ultrasonic waves, distributions of the noble metal and the transition metal elements in nanoparticles may be controlled according to a vapor pressure difference of the noble metal precursor and the transition metal precursor.

For example, in the nanoparticles, the noble metal having a low vapor pressure may be disposed in shell portions, and the transition metal having a high vapor pressure may be disposed in core portions, forming core-shell particles 300.

The irradiating of the ultrasonic waves may be performed for about 20 minutes to about 2 hours at an output of about 125 W to about 200 W based on 100 mL of the precursor mixed solution. When the irradiating of the ultrasonic waves is performed at an output of less than about 125 W or for a time of less than about 20 minutes, metal ions may be insufficiently reduced; while when at greater than about 200 W or for greater than about 2 hours, a particle size thereof may be unnecessarily grown.

The noble metal precursor may include those having a lower vapor pressure than the vapor pressure of the transition metal precursor and contributing to a galvanic substitution reaction after forming transition metal seed particles and enlarging the sizes thereof. For example, the noble metal precursor may be in a form of a noble metal salt, and may include a nitrate, a sulfate, an acetate, a chloride, an oxide, or a combination thereof. Specifically, the noble metal precursor may be an acetyl acetonate of noble metal, a hexafluoroacetyl acetonate of the noble metal, or a pentafluoroacetyl acetonate of the noble metal.

The transition metal precursor may be in a form of salts of the transition metal, and may include, for example, a nitrate, a sulfate, an acetate, a chloride, an oxide, or a combination thereof. Specifically, the transition metal precursor may be an acetyl acetonate of the transition metal, a hexafluoroacetyl acetonate of the transition metal, or a pentafluoroacetyl acetonate of the transition metal.

The transition metal precursor is rapidly volatilized by a high vapor pressure and rapidly captured in a cavity by the ultrasonic waves, so the transition metal may be disposed in a core portion in the core-shell particles 300.

Since the content of the crystalline carbon support is the same as described above, a repetitive description will be omitted.

The precursor mixed solution may further include a reducing solvent.

The reducing solvent may include an organic material having no moisture and oxygen source, for example, a solvent having a reducing power at a temperature of greater than or equal to about 70° C. or a solvent having a reducing power at a temperature of about 70° C. to about 400° C. Specifically, the reducing solvent includes ethylene glycol, di-ethylene glycol, tri-ethylene glycol, poly-ethylene glycol, or a combination thereof.

The reducing solvent reduce reactants of a noble metal precursor and a transition metal precursor in a cavity formed by the ultrasonic treatment, and also, maintain a high boiling point to create an external liquid environment for generating and extinguishing a cavity.

Meanwhile, on the surface of the core-shell particles 300 formed by the ultrasonic treatment, a transition metal oxide coating layer 350 surrounding a noble metal shell 320 may be included.

The transition metal oxide coating layer 350 may be formed by insufficient solubility of a transition metal into a platinum lattice, a difference of the reduction rates, and a component ratio of an excessive amount of a transition metal during the ultrasonic treatment.

The transition metal oxide coating layer 350 may have a thickness of about 0.2 nm to about 0.88 nm. When the thickness of the transition metal oxide coating layer 350 is less than about 0.2 nm, a non-uniform coating layer may be formed, and the particle size may not be well controlled due to its thin thickness, while when it exceeds about 0.88 nm, the transition metal oxide may be crystallized after the annealing process and a residue may remain after the acid treatment.

The transition metal oxide coating layer 350 is derived from the transition metal precursor as in the transition metal core 310, so the transition metal included in the transition metal oxide coating layer 350 may be same as the transition metal included in the transition metal core 310.

The method of preparing a catalyst for a fuel cell according to one form of the present disclosure provides core-shell particles 300 including a transition metal oxide coating layer 350 in one process using ultrasonic treatment, so that the process may be simplified to save the cost.

Then the core-shell particles 300 are annealed to provide intermetallic active particles 201 including a transition metal oxide coating layer 350 (S2-2).

Through the annealing process, an alloying degree of the noble metal and the transition metal increases, a ratio of the transition metal core 310 decreases, and thus the intermetallic active particles 201 are formed.

At this time, as the particle growth is suppressed by the transition metal oxide coating layer 350, the sizes of the intermetallic active particles 201 may be controlled to be sizes of several nanometers during the annealing process, so the alloying degree increases by performing the annealing process at a sufficiently high temperature to enhance uniformity of the composition and a catalytic activity.

The annealing may be performed at about 700° C. to about 1200° C. for about 0.5 hours to about 16 hours. When the annealing temperature is less than about 700° C. or the annealing time is less than about 30 minutes, an increase in catalytic activity may be limited due to the lack of improvement of the alloying degree. When the annealing temperature exceeds about 1200° C. or the annealing time exceeds about 16 hours, an effect of inhibiting particle size growth may decrease, resulting in decreased catalytic activity.

The annealing process may be performed in an inert gas atmosphere such as argon, nitrogen, or a mixed gas atmosphere of an inert gas and hydrogen ($H_2$), and an atmosphere including about 1 volume % to about 10 volume % of hydrogen based on a total volume of the mixed gas.

Finally, the transition metal oxide coating layer 350 is removed from the intermetallic active particles 201 (S2-3).

The removing of the transition metal oxide coating layer 350 in the intermetallic active particles 201 may be performed by acid treatment.

The acid used for the acid treatment may include $HClO_4$, $HNO_3$, HCl, or a combination thereof.

A concentration of the acid may be about 0.01 M to about 1.0 M. When the concentration of the acid is less than about 0.01 M, residues may remain, while when the concentration of the acid exceeds about 1.0 M, noble metal may be dissolved together.

The acid treatment may be performed at about 60° C. to about 94° C. for about 2 hours to about 4 hours. When the acid treatment temperature is less than about 60° C. or the acid treatment time is less than 2 hours, residues may remain. When the acid treatment temperature exceeds about 94° C. or when the acid treatment time exceeds about 4 hours, the noble metal catalyst may be dissolved.

Meanwhile, the catalyst for a fuel cell may include a noble metal skin layer 340 on the surface of the intermetallic active particles 201. That is, according to the method of preparing a catalyst for a fuel cell according to one form of the present disclosure, since the core-shell particles 300 formed by being irradiated with the ultrasonic waves include a transition metal in the core, the intermetallic active particles 201 obtained by performing the same with the annealing process includes noble metal particles exposed on the outer surface of the catalyst to provide a noble metal skin layer 340 in which the noble metal particles are dispersed with a high density on the surface of the intermetallic active particles 201.

Another form of the present disclosure provides an electrode for a fuel cell, including the catalyst for a fuel cell and an ionomer mixed with the catalyst for a fuel cell.

Another form of the present disclosure provides a membrane-electrode assembly including an anode and a cathode facing each other, and an ion exchange membrane between the anode and cathode, wherein the anode, the cathode, or both are the aforementioned electrodes.

Another form of the present disclosure provides a fuel cell including the aforementioned membrane-electrode assembly.

The electrode, the membrane-electrode assembly, and the fuel cell are the same as those of the general electrode, the membrane-electrode assembly, and the fuel cell, except that the aforementioned catalyst for a fuel cell is included, so detailed descriptions thereof will be omitted.

Hereinafter, specific examples of the disclosure are described. However, the examples described below are for illustrative purposes only, and the scope of the disclosure is not limited thereto.

Preparation Example: Preparation of Catalyst for Fuel Cell

Example 1

A crystalline carbon support having a specific surface area of 230 $m^2/g$, a Raman spectrum intensity ratio ($I_G/I_D$) of 0.94, an interplanar spacing ($d_{002}$) of a (002) plane of 0.352 nm, and a carbon shell thickness of 4 nm was prepared.

$Pt(acac)_2$, $Fe(acac)_3$, the crystalline carbon support were added into ethylene glycol to prepare a precursor mixed solution, and 100 mL of the precursor mixed solution was irradiated with ultrasonic waves by using tip type ultrasonic waves (Model VC-500, Sonic & Materials Inc., amplitude 30%, 13 mm solid probe, 20 kHz) under an argon atmosphere at output of 150 to 200 W for 2 hours to provide core-shell particles including a transition metal oxide coating layer.

At this time, the addition amounts of the noble metal precursor and the transition metal precursor were adjusted so that an atomic ratio of the noble metal and the transition metal may be 1:0.5, respectively.

The prepared core-shell particles were annealed at 800° C. for 2 hours under a $H_2$/Ar mixed gas atmosphere to provide intermetallic particles including a transition metal oxide coating layer.

The intermetallic particles were treated with a mixed solution of 0.1 M $HClO_4$ and ethanol at 94° C. for 4 hours to prepare the catalyst for a fuel cell.

Comparative Example 1

A catalyst for a fuel cell was prepared according to the same method as Example 1 except that a high specific surface area carbon support (Tradename KB300J, Manufacturer: Lion) having a high specific surface area of 783 $m^2/g$, a Raman spectrum intensity ratio ($I_G/I_D$) of 0.86, and an interplanar spacing ($d_{002}$) of a (002) plane of 0.367 nm was used.

Experimental Example 1: XRD Analysis of Catalyst for Fuel Cell

Figure 5:
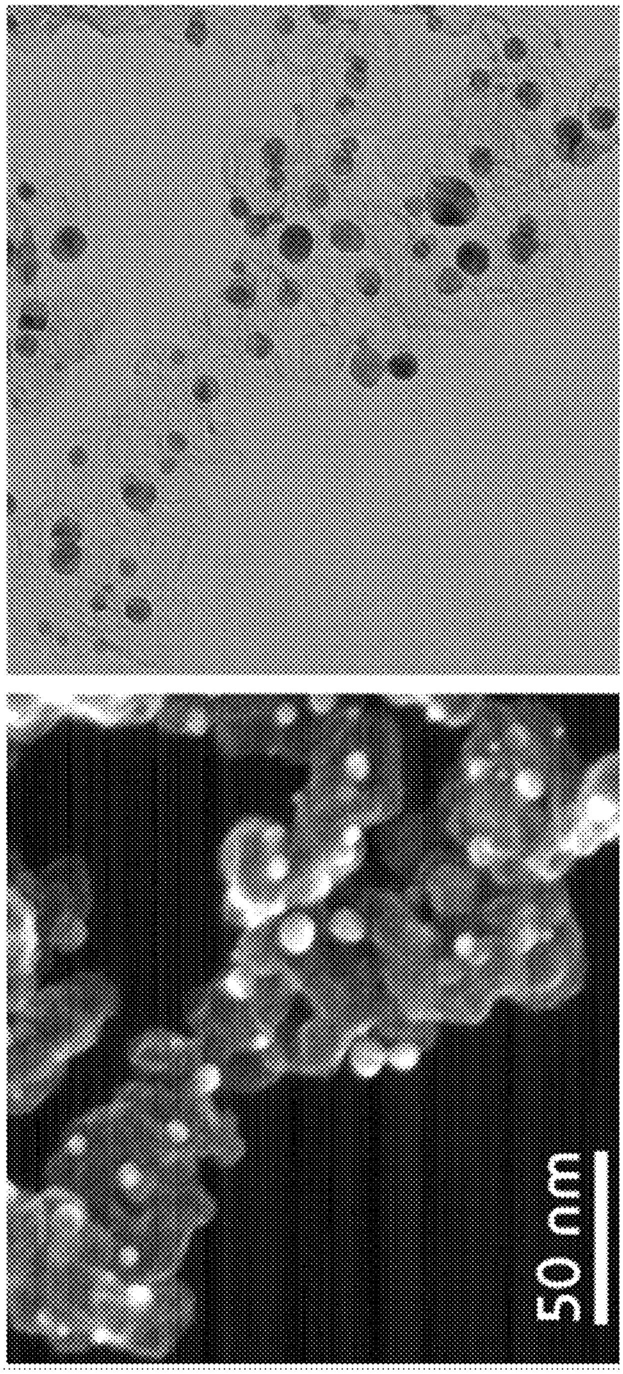
FIG. 5 is a scanning electron micrograph (SEM) image and a transmission electron micrograph (TEM) image of the catalyst prepared in Example 1.
Figure 6:
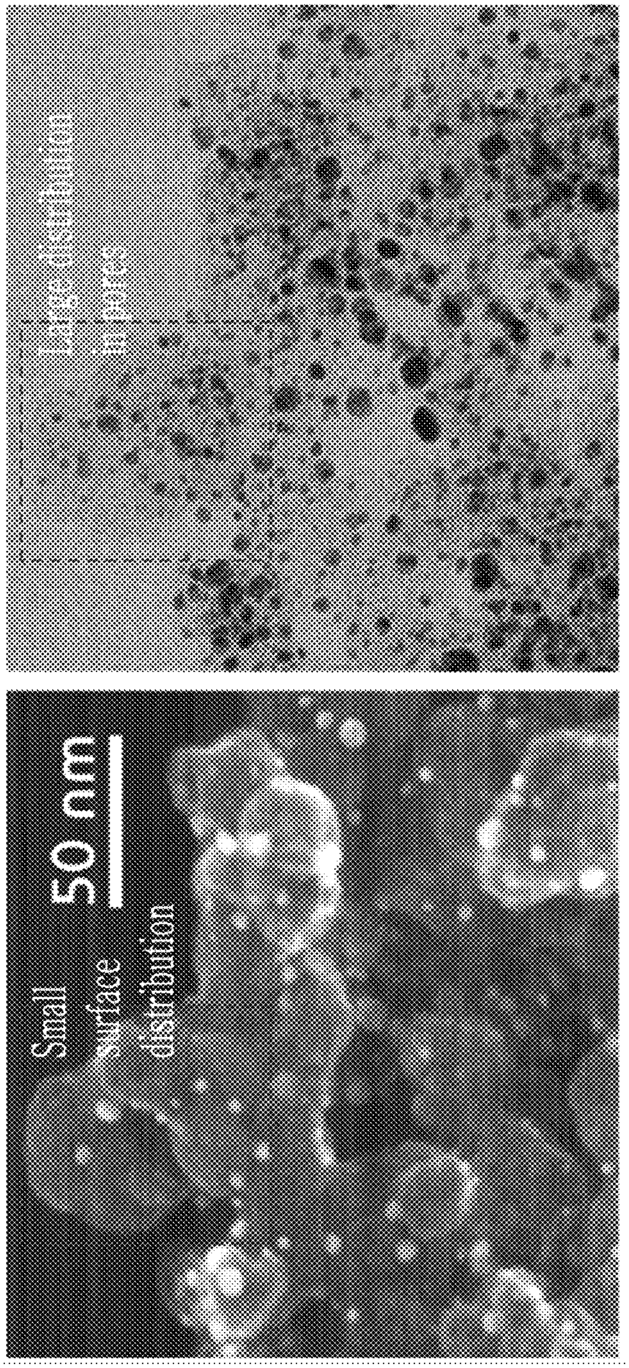
FIG. 6 is a scanning electron micrograph (SEM) image and a transmission electron micrograph (TEM) image of the catalyst prepared in Comparative Example 1.

FIG. 5 is a scanning electron micrograph (SEM) image and a transmission electron micrograph (TEM) image of the catalyst prepared in Example 1, and FIG. 6 is a scanning electron micrograph (SEM) image and a transmission electron micrograph (TEM) image of the catalyst prepared in Comparative Example 1.

Referring to FIGS. 5 and 6, intermetallic active particles had a different particle diameter depending on a pore structure of the carbon supports. In other words, in Example 1 to which the crystalline carbon support was applied, all active particles were distributed on the carbon surface, but in Comparative Example 1 to which the high specific surface area carbon support was applied, about 60% by the number of particles was distributed on the carbon surface, while 40% by the number of the particles was distributed inside the carbon (embedded in pores).

In addition, the active particles present inside the pores of the high specific surface area carbon support were mostly formed to be small (<3 nm). In the process of forming the active particles, the active particles were formed inside the micropores and then, agglomerated due to a confinement effect, thereby no longer growing and deteriorating a yield of an active catalyst.

Figure 7:
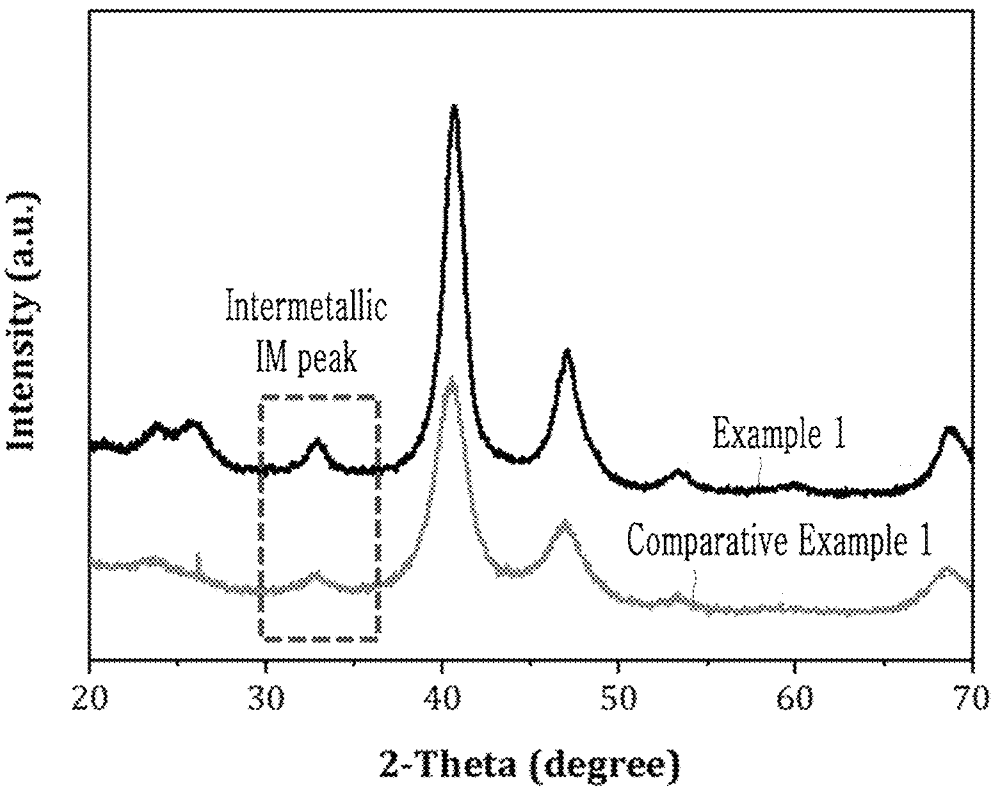
FIG. 7 is a graph showing the results of XRD analysis of the catalysts prepared in Example 1 and Comparative Example 1.

FIG. 7 is a graph showing the results of XRD analysis of the catalysts prepared in Example 1 and Comparative Example 1.

Referring to FIG. 7, Comparative Example 1 to which the high specific surface area carbon support was applied exhibited a lower intermetallic ordering feature peak than Example 1 to which the crystalline carbon support was applied.

Experimental Example 2: Performance and Durability Evaluation of Catalyst for Fuel Cell The catalysts (40%) according to Example 1 and Comparative Example 1 were respectively dispersed in an n-propanol solvent at an ionomer carbon ratio (I/C) of 0.6 to prepare slurry. Each slurry was coated on a releasing paper (a cathode: Pt loading of 0.1 $mg/cm^2$, an anode: Pt loading of 0.025 $mg/cm^2$). Between the cathode and the anode, a nafion membrane was interdisposed and then, bonded to manufacture a membrane electrode assembly (MEA).

After connecting the manufactured MEA to a fuel cell evaluation equipment, performance thereof was evaluated at 65° C., 1 bar under 2500 sccm of air and 350 sccm of $H_2$, and a durability acceleration evaluation (AST 5*k*) of the carbon supports was performed under cyclic voltammetry of 1.0 V to 1.5 V at 5000 cycles.

Figure 8:
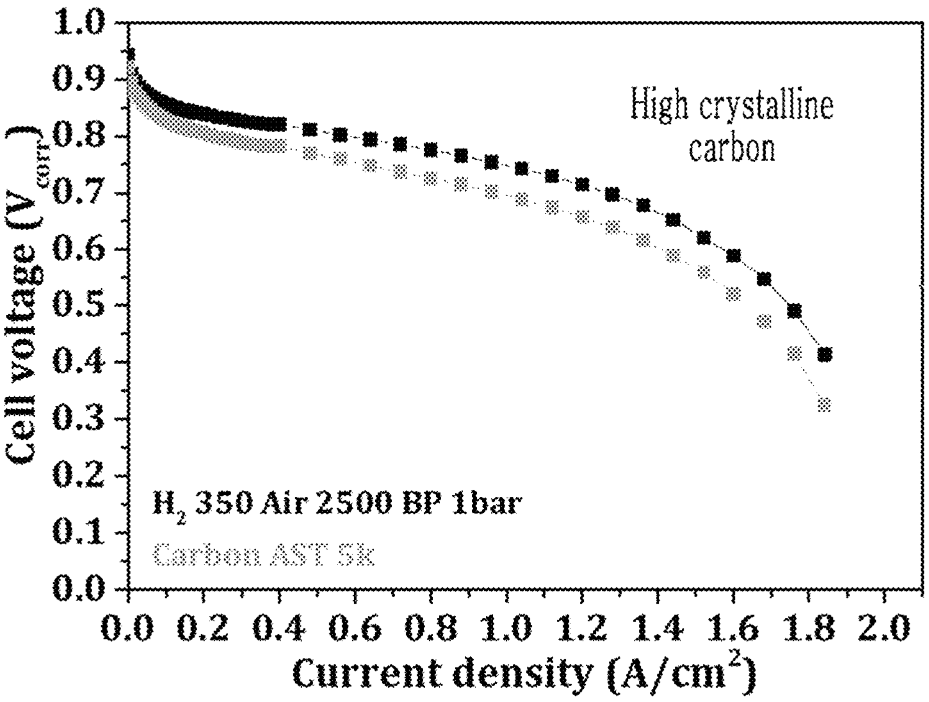
FIGS. 8 and 9 are graphs showing the performance and durability evaluation results of the catalyst prepared in Example 1.
Figure 9:
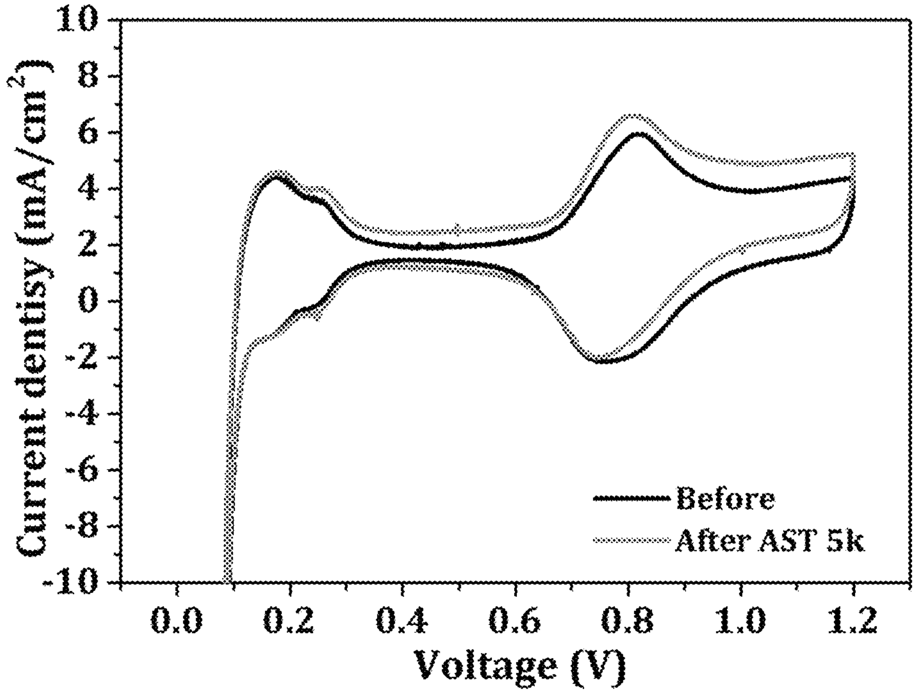
Figure 10:
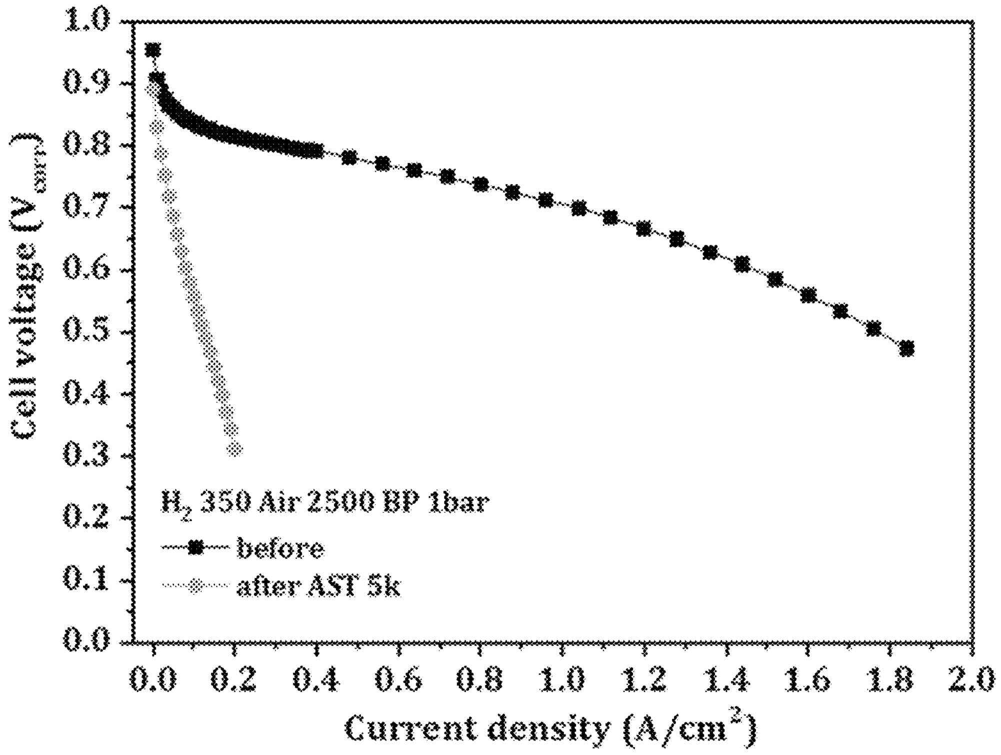
FIGS. 10 and 11 are graphs showing the performance and durability evaluation results of the catalyst prepared in Comparative Example 1.
Figure 11:
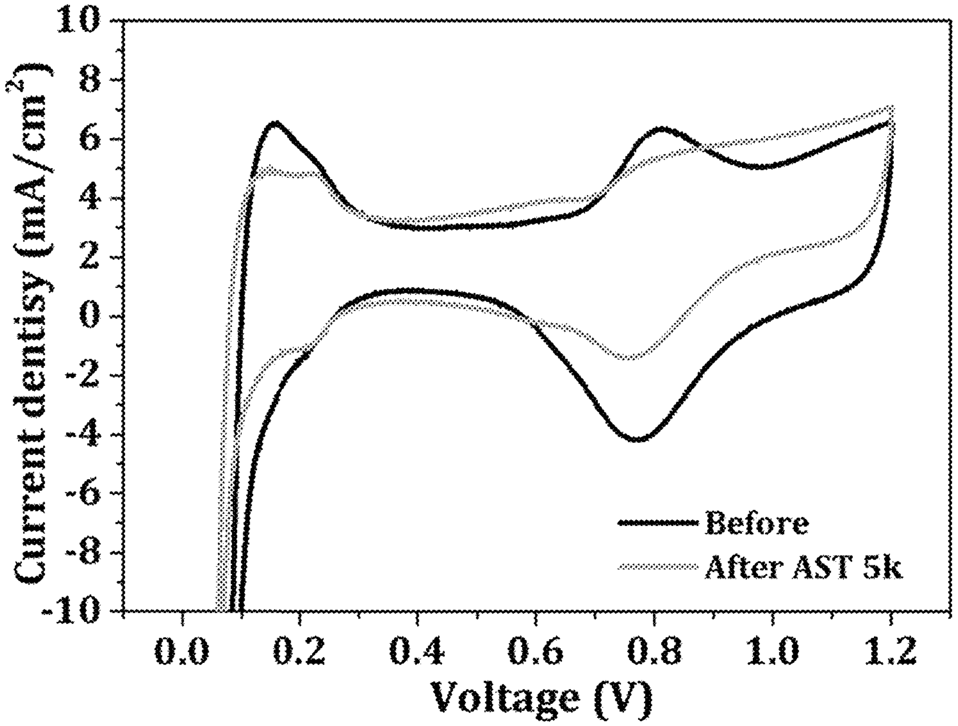

FIGS. 8 and 9 and Table 1 show the performance and durability evaluation results of the catalyst prepared in Example 1, and FIGS. 10 and 11 and Table 2 show the performance and durability evaluation results of the catalyst prepared in Comparative Example 1.

TABLE 1

| $H_2$ 350 Air 2500 (BP 1 bar) | ECSA $m^2/g$ Pt | Current density @ 0.8 V | Current density @ 0.7 V | Current density @ 0.6 V | HFR ($m\Omega \cdot cm^2$) | Cell voltage @ 1.5 $mA/cm^2$ |
|---|---|---|---|---|---|---|
| Before | 25.9 | 0.579 | 1.267 | 1.572 | 57.4 | 0.634 |
| After ast 5k | 25.1 | 0.231 | 0.979 | 1.412 | 50.6 | 0.571 |
| Retention | 96.9% | 40% | 77% | 90% | — | Δ 63 mV |

TABLE 2

| $H_2$ 350 Air 2500 (BP 1 bar) | ECSA $m^2/g$ Pt | Current density @ 0.8 V ($A/cm^2$) | Current density @ 0.7 V ($A/cm^2$) | Current density @ 0.6 V ($A/cm^2$) | HFR ($m\Omega \cdot cm^2$) | Cell voltage @ 1.5 $A/cm^2$ (V) |
|---|---|---|---|---|---|---|
| Before | 39.1 | 0.406 | 1.04 | 1.47 | 67.4 | 0.590 |
| After ast 5k | 22.8 | 0.016 | 0.045 | 0.080 | 124.6 | 0 |
| Retention | 58.3 % | — | — | — | — | Δ 590 mV |

Referring to FIGS. 8 to 11 and Tables 1 to 2, the catalyst according to Example 1 exhibited a 120% initial performance improvement and about 220% performance improvement after the durability acceleration experiment, compared with the catalyst according to Comparative Example 1.

In other words, the crystalline carbon support used in Example 1 lowered a specific surface area and simultaneously, had high crystallinity but relatively fewer defects, resulting in improved carbon durability and performance.

On the contrary, the catalyst according to Comparative Example 1 exhibited lower initial performance than the catalyst according to Example 1 and a larger difference in the durability results. The reason is that the high specific surface area carbon support used in Comparative Example 1 had low crystallinity and high bonding (defects) and thus poor resistance under carbon corrosion conditions.

While this disclosure has been described in connection with what is presently considered to be practical example forms, it is to be understood that the disclosure is not limited to the disclosed forms. On the contrary, it is intended to cover various modifications and equivalent arrangements included within the spirit and scope of the present disclosure.

The invention claimed is:

1. A method of preparing a catalyst for a fuel cell, the method comprising:

irradiating ultrasonic waves to a precursor mixed solution including a noble metal precursor, a transition metal precursor, and a crystalline carbon support having a specific surface area of about 200 $m^2/g$ to about 500 $m^2/g$, and forming core-shell particles including a transition metal oxide coating layer;

annealing the core-shell particles and forming intermetallic particles including a transition metal oxide coating layer; and removing the transition metal oxide coating layer from the intermetallic particles, and wherein the catalyst comprises the crystalline carbon support, and intermetallic active particles of a transition metal and a noble metal, wherein the intermetallic active particles are supported on the crystalline carbon support and have a particle diameter of greater than or equal to about 3 nm, and wherein the catalyst comprises more than about 0% and about 40% or less by number of the intermetallic active particles embedded in pores of the carbon support, and more than about 60% and about 100% or less by number of the intermetallic active particles present in a surface of the carbon support with respect to a total number of the intermetallic active particles, wherein the intermetallic active particles comprise an intermetallic core of the transition metal and the noble metal, and a noble metal skin layer surrounding the intermetallic core, wherein the noble metal comprises platinum (Pt) and the transition metal comprises iron (Fe), wherein the crystalline carbon support has a carbon shell thickness of about 3 nm to about 6 nm; and wherein the core-shell particles comprise a transition metal core, a noble metal shell surrounding the transition metal core, and a transition metal oxide coating layer surrounding the noble metal shell.

2. The method of claim 1, wherein irradiating of the ultrasonic waves is performed for about 20 minutes to about 2 hours at an output of about 125 W to about 200 W based on 100 mL of the precursor mixed solution.

3. The method of claim 1, wherein the intermetallic particles comprise:

intermetallic particles of a transition metal and a noble metal; and a transition metal oxide coating layer surrounding the intermetallic particles.

4. The method of claim 1, wherein annealing is performed at about 700° C. to about 1200° C. for about 2 hours to about 4 hours.

5. The method of claim 1, wherein annealing is performed under a mixed gas including hydrogen ($H_2$) and argon (Ar), and the mixed gas comprises hydrogen ($H_2$) in an amount of about 1 volume % to about 10 volume % based on a total volume of the mixed gas.

6. The method of claim 1, wherein removing the transition metal oxide coating layer from the intermetallic particles is performed by an acid treatment at about 60° C. to about 94° C. for about 2 hours to 4 hours.

7. The method of claim 6, wherein an acid used for the acid treatment comprises $HClO_4$, $HNO_3$, $H_2SO_4$, HCl, or a combination thereof.

8. The method of claim 6, wherein a concentration of an acid used for the acid treatment is about 0.01 M to about 1.0 M.

* * * * *